United States Patent [19]

Lowther

[11] 4,178,239

[45] Dec. 11, 1979

[54] BIOLOGICAL INTERMEDIATE SEWAGE TREATMENT WITH OZONE PRETREATMENT

[75] Inventor: Frank E. Lowther, Severna Park, Md.

[73] Assignee: Union Carbide Corporation, New York, N.Y.

[21] Appl. No.: 523,223

[22] Filed: Nov. 13, 1974

[51] Int. Cl.² ............................ C02B 1/38; C02C 1/06
[52] U.S. Cl. ...................................... 210/15; 210/18; 210/63 Z
[58] Field of Search .................... 210/15, 18, 63 Z, 62, 210/63 R, 64

[56] References Cited

U.S. PATENT DOCUMENTS

| | | | |
|---|---|---|---|
| 3,660,277 | 5/1972 | McWhirter et al. | 210/63 |
| 3,730,881 | 5/1973 | Armstrong | 210/18 X |
| 3,779,909 | 12/1973 | Wisfeld et al. | 210/29 |
| 3,804,755 | 4/1974 | Cervantes | 210/63 |

Primary Examiner—Thomas G. Wyse
Attorney, Agent, or Firm—John C. LeFever

[57] ABSTRACT

A process for intermediate treatment of aqueous sewage containing biodegradable materials and non-biodegradable materials. The sewage is contacted with an ozone-containing gas to pretreat the sewage by converting a substantial amount of the non-biodegradable material to biodegradable material, followed by a conventional secondary treatment with an $O_2$-containing gas such as air in the presence of aerobic or facultative anaerobic microorganisms.

The process may also include subsequent tertiary treatment with ozone to destroy the microorganisms after secondary treatment. A relatively small amount of the overall oxidizing gas requirements is provided by ozone. The secondary treatment is made more efficient by the ozone pretreatment.

2 Claims, 2 Drawing Figures

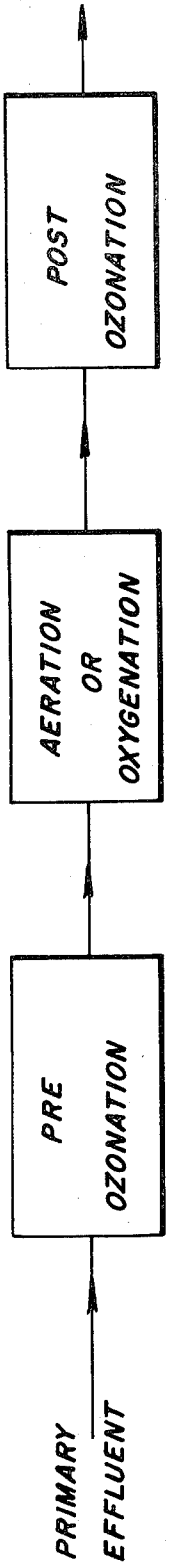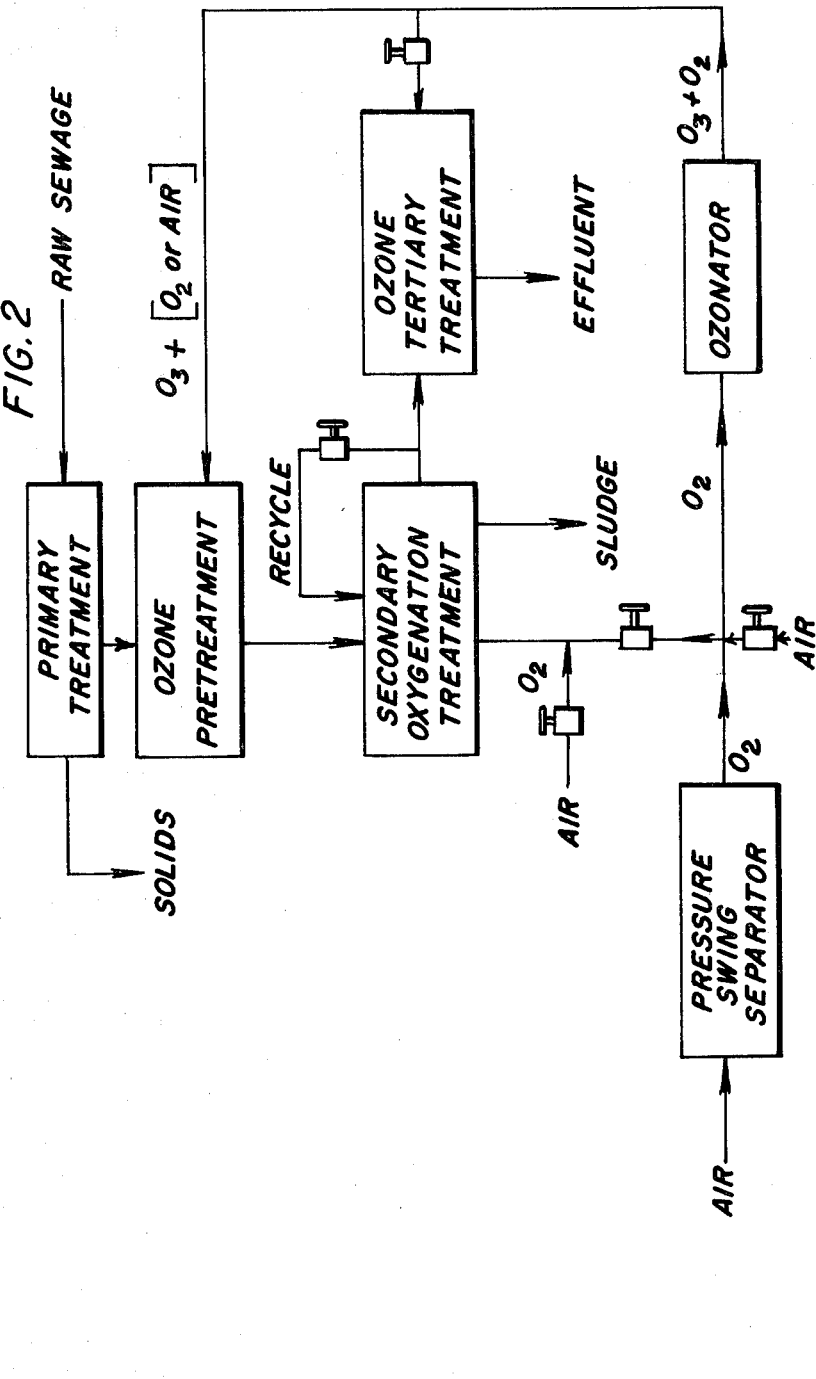

BIOLOGICAL INTERMEDIATE SEWAGE TREATMENT WITH OZONE PRETREATMENT

BACKGROUND OF THE INVENTION

This invention relates to treatment of spent water supply. In particular it relates to treating primary sewage effluent in an intermediate system to effect biological removal of oxidizible sewage solids. The typical community sewage plant for treatment of residential and/or industrial waste water includes three categories of treatment system, usually designated primary, secondary and tertiary.

The primary treatment consists of any operations, such as screening or sedimentation, that remove particles above colloidal size. It also usually removes some 30-60% of the BOD. Removal of colloidal or dissolved materials, and further reduction of the BOD, is accomplished by secondary treatment, which is biological, by encouraging the growth of microorganisms that utilize waste material in the sewage as food. One commonly used definition of tertiary treatment is any treatment in addition to secondary treatment, such as disinfection.

In the primary treatment stage the sewage is moved by gravity flow or by pumping. Flow velocities in the pipe are usually maintained above a minimum of 70 cm/sec. in order that solids do not settle out in the pipe. Low flow velocities, long detention times, and relatively high temperatures have caused treatment difficulties. It is customary to have a means of bypassing the plant during periods of flow that exceed the hydraulic capacity of the plant. Generally multiple units are provided for each stage of treatment. Thus, during periods of routine maintenance or repairs, it is not necessary to by-pass this treatment stage. Protection is given to pumps against large objects in sewage by employing coarse racks with clear openings greater than 5 cm. Mechanically cleaned racks allow smaller clear openings because hydraulic head loss is low. Mechanical cleaning can be either continuous or intermittent. Comminutors may be used to macerate floating material into sizes sufficiently small (for example, less than 1 cm) so that particles will not clog centrifugal pumps.

Grit chambers are sometimes placed ahead of sedimentation chambers to remove heavy solids without removing finer sediment, to prevent excessive wear in pumps, and for protection against loss of volumetric capacity.

In the sedimentation tanks (settling tanks) the smaller solids settle, and oil and grease, which are lighter than water, float and can be skimmed and taken to the sludge digester.

There are two main processes utilized for biological secondary treatment of waste water. They are the trickling filter, and the activated sludge process.

Present-day biological treatment methods are basic processes evolved over the years, but the underlying principles remain unchanged. The basis is the formation of a suitable environment so that microorganisms may thrive under controlled conditions. The microorganisms may come from the sewage itself. The suitable environment is one which is rich in food and maintained in an aerobic state.

Intermittent sand filters are much like slow and filters used in potable water treatment. The sewage is applied to the sandy area and allowed to flow slowly downward. Surface accumulations of solids are periodically removed. Biological films that form on the sand grains undergo continuous stabilization and it is usually necessary to rest the beds between dosings so that objectionable conditions do not develop.

The trickling filter is a construction of stones (or other coarse material) over which the sewage flows. This process is probably the most widely used aerobic biological treatment method. Sewage is distributed by slowly rotating arms equipped with nozzles and deflectors, and allowed to flow slowly over the filter stones. Air is drawn into the filter by temperature differential, thus keeping a supply of oxygen.

The filter medium may be stone or plastic filter media (2-10 cm). These stones permit sufficiently loose packing to allow free flow of water and air with sufficient openings to prevent clogging by biological slimes. Sewage flows slowly downward over the filter medium and the effluent is collected in tile underdrains, which provide for collection of filter effluent and circulation of air into the filter. The underdrains discharge into a main collection channel which in turn discharges to a final settling tank before tertiary treatment.

In contrast to the trickling-filter process, the activated sludge floc is suspended in the moving stream. This process originated in attempts to purify sewage by blowing air into it. It was observed that after prolonged aeration of sewage in a tank, flocs composed of voraciously feeding organisms developed. When aeration was stopped, this floc settled. Addition of fresh sewage to the tank containing the sludge produced high purification in a reasonable time. Thus, the name given the floc was activated sludge. As was the case with the trickling filter, the activated sludge process may be operated as a fill-and-draw system or continuous operation can be employed. The process involves the return of some of the activated sludge to the aeration tank influent and discharge of excess sludge to digestion, aeration of the sludge-sewage mixture to attain purification, and settling of the aeration tank effluent to remove floc from the plant effluent. Floc is formed in sewage by aerobic growth of unicellular and filamentous bacteria. Protozoa, bacteria and other aerobic or facultive anaerobic organisms are found in the floc matrix. These organisms gain food and energy by feeding upon the sewage. In this aerobic process, air requirements are high because oxygen is only slightly soluble in water (10 mg/liter).

The activated sludge process of treating sewage is well known, as are modifications, such as the "contact stabilization" process. These processes employ aerobic biological stabilization of sewage pollutants. The activated sludge of these processes is a flocculent, heterogenous mixture of inert materials and microorganisms. The processes by which biodegradation take place usually employ aerobic micro-organisms, those species which require oxygen for living and growing. Bio-oxidation of sewage can also be effected in the presence of facultive anaerobes, which are microorganisms normally using free oxygen, but which can live with little or none.

The micro-organisms of primary significance are bacteria and protozoa. When untreated sewage is mixed with activated sludge, the micro-organisms in the sludge stabilize the biodegradable organic materials of the sewage by metabolism, producing carbon dioxide, water, and newly synthesized microbial cells or activated sludge. Separation of the activated sludge from the water by sedimentation produces a clear, supernatant liquid that can be safely discharged to a receiving stream or river or the like, with or without tertiary treatment.

The activated sludge which settles out by sedimentation is normally retained in the system for mixing with additional untreated sewage. After the plant or system has been in operation for a period of time, however, it becomes necessary to dispose of some of the accumulated sludge. The sludge mess can be significantly reduced by aerating it for an extended period of time in the absence of organic food or sewage by a process known as endogenous respiration or aerobic digestation. It is similar to basal metabolism in animals; that is, the microbes literally eat or burn themselves up. Ultimate disposal of the digested sludge ash can be safely carried out by spreading it on agricultural land, for example. A complete description of secondary sewage treatment is given in U.S. Pat. Nos. 3,355,023; 3,654,146; 3,769,204; 3,803,029; 3,794,581; 3,804,255; 3,812,032; 3,817,857 and 3,812,512, incorporated herein by reference.

Biological oxidation methods have mostly employed air as the large oxygen source. The quantity of air required to supply oxygen is primarily due to the 4/1 dilution with nitrogen, and typically only 5-10% of the oxygen is absorbed due to the low oxygen mass transfer efficiency of the method. The large amount of energy supplied to the air is normally sufficient to mix and suspend the bacterial solids in the liquid.

The direct use of oxygen instead of air in treatment of municipal and chemical wastes has been developed because of its potential advantages in reducing the quantity of required gas, primarily due to retention time reduction. Because of the additional cost of oxygen, it must be used sparingly and effectively. This necessitates a small volumetric ratio of gas-to-liquid as compared to air aeration. The partial pressure of oxygen in the aerating gas must be sustained at high level to achieve economics in the cost and operation of aeration equipment while still obtaining high rates of oxygen dissolution. Although prior art systems can be designed to achieve a high percentage oxygen absorption, they are not readily adapted to the handling of mixed liquid-solid suspensions such as encountered in the activated sludge process for waste water treatment. Neither are the conventional systems suited for contacting large volumes of liquid and small volumes of gas with high rates of dissolution and with low energy consumption.

The achievement of both high oxygen utilization and high oxygen partial pressure in biological oxidation is further complicated by the evolution of diluent gases from the mixed liquor undergoing aeration. Usually the BOD-containing feed water to the process is nitrogen-saturated with respect to air. While mass transfer of nitrogen is not a consideration when air aeration is employed, it becomes a very significant factor when the nitrogen content of the aeration gas is reduced and the volume of aeration gas becomes small. This is because the dissolved nitrogen will be stripped from the liquid into the gas and will reduce the oxygen partial pressure of the gas. Other gases evolved from the liquid which are inert to the biochemical reaction will have a similar effect, e.g., argon and moisture. Carbon dioxide, which is a product of the oxidation, will also evolve in substantial quantity and further suppress the oxygen partial pressure. The use of oxygen-enriched secondary sewage treatment is disclosed in U.S. Pat. Nos. 3,547,812; 3,547,814; 3,547,815 and 3,660,277, incorporated herein by reference. If an oxygen-enriched aeration gas is utilized effectively, then its volume relative to air will be very low, e.g., 1/90. While this offers opportunities for cost savings in gas compression, it presents problems in liquid mixing and of oxygen dilution with impurities. The total energy input to the small quantity of gas for purposes of oxygen solution may now be far less than that required for suspending and mixing the solids in the liquid. The inert gases evolved from the liquid will also impair the oxygen partial pressure to a greater extent as the quantity of aeration gas is reduced.

SUMMARY OF THE INVENTION

It has been discovered that overall sewage removal in an intermediate biological treatment can be improved by employing ozone treatment prior to the conventional secondary treatment. The amount of ozone consumed in the pretreatment is a minor amount of the total oxidizing gas requirements for the intermediate treatment. Ozone pretreatment is found to increase the BOD of sewage, making larger amounts of sewage components susceptible to biological secondary treatment under conventional aerobic conditions. The ozone pretreatment may be used in combination with an activated sludge secondary process. Air diffusion or mechanical aeration processes can benefit substantially from ozone pretreatment.

Accordingly, it is an object of the present invention to provide a novel process for intermediate treatment of sewage containing biodegradable materials and non-biodegradable materials wherein ozone-pretreated sewage is contacted in a secondary treatment with an $O_2$-containing gas in the presence of aerobic microorganisms. A further object is to provide an ozoning intermediate step for contacting the sewage that an ozone-containing gas to pretreat the sewage by converting a substantial amount of the non-biodegradable material to biodegradable material. These and other objects and advantages of the invention will be apparent from the specification and drawing.

THE DRAWING

FIG. 1 is a flow sheet showing a typical sequential sewage treatment process, and FIG. 2 is a similar flow sheet of a preferred embodiment of the invention.

Description

The BOD of a typical community sewage system is about 10 to 100 pounds BOD/1000 ft$^3$ 8-day (0.16 to 1.6 g/l-day). This is frequently expressed as organic loading; however, inorganic materials have substantial affect on the BOD. Ozone pretreatment can increase the overall biodegradable content of sewage, thus improving removal efficiency. Typical prior art trickling filter secondary treatment removes 65-85% of biodegradable materials; and certain high-rate or super-rate trickling filters or activated sludge processes may remove over 95% of the BOD. However, the non-biodegradable materials largely remain. By converting these materials to degradables, the total BOD and overall removal can be increased.

Increasing the biodegradable content of sewage has been described by D. Thinumurthi in "Ozone in Water Treatment and Wastewater Renovation," Water & Sewage Works, Vol. 115, pp. R106-12; and in "Ozone Disinfection of Secondary Effluents," Welsbach Corp. Publication, December 1971. Ozone pretreatment can be employed economically with about 0.01 to 1.0 ppm $O_3$ per ppm of total oxidizable waste.

The amount of ozone consumed in the pretreating step varies widely with the composition of the primary treatment effluent and conditions of temperature, pH, salinity, etc. Dosage rates of 20 g/liter or more may be employed; however, the economical operation of a biological intermediate treatment requires that a small amount of total oxidation be accomplished by addition of $O_3$ with the major portion of oxidation being effected with air or $O_2$-enriched gas. Little advantage can be obtained if the process stream contains no significant amounts of non-biodegradable materials of the type which can be ozone-converted.

In FIG. 1, ozone is injected directly into the primary effluent making many organic compounds biodegradable (BOD) that previously were not. Air or oxygen is injected in the intermediate stage (secondary treatment) to supply oxygen (dissolved) to speed up the biological digestion of wastes process. Typically this is a 1-6 hour step. Ozone again is injected in the third stage for disinfection. The gas injection system may be the same at all three stations. However, the gas to water volumetric ratio at injection will be different at the various stations. The basic contactor module would typically handle 1 million gallons/day. Multiple modules would work (or discharge) into a common retention tank. The ozone/water stream in the post ozonation (tertiary) system is found to "float" nearly all suspended solids to the surface where they can be removed. Organics are thus removed three ways, by the biological action, by chemical oxidation, and by physical flotation.

Ozone Contactor Apparatus

In order to optimize use of ozone, it is important that the $O_3$-containing gas be contacted efficiently with the water-borne materials, whether in the ozone pretreatment or in the tertiary treatment. Ozone-containing gas produced in an on-site ozonator may be contacted with the primary effluent using commercially available contactor apparatus. In the well known Otto system, ozone/air mixture is introduced by an aspiration device employing a water pump to create an emulsion. The ozone/water mixture is carried through a vertical tube to the bottom of a deep tower. Numerous bubbles provide contact through the water and the gas result from the rising emulsion. This apparatus is described in Advances in Chemistry Series No. 21, "Ozone Chemistry and Technology" ACS 1959, pages 448-465. Other available contacting apparatus includes the Chlorator, Torricelli and Kerag systems. Various types of injector or agitator apparatus may be employed. In copending U.S. patent application Ser. No. 443,176, filed Feb. 15, 1974, incorporated herein by reference, an ozone contactor apparatus employing positive pressure injections is disclosed and is a preferred method of treating aqueous sewage according to the present invention. Other suitable ozone contacting methods and equipment are disclosed in U.S. Pat. Nos. 3,775,314; 3,504,038; 3,822,786 and 3,748,262 (Lee et al), incorporated herein by reference. The Lee patent provides a closed loop ozone generating and contacting system for sewage, along with ancillary technology in pressure swing air fractionation to obtain an oxygen rich feedstream.

Biological aeration performs three functions: Transfer of oxygen to the sewage; intimate mixing of sewage and floc; and floc suspending.

Air may be introduced from diffusers in such a way as to set up a spiral flow pattern, thus aiding mixing of floc and sewage. Oxygen demand decreases as the sewage flows through the aeration tank, and diffuser units are distributed from the head of the tank to the end of the tank to obtain "tapered aeration." Mechanical aeration has the same function as air diffusers but is accomplished by rotating paddles or brushes.

The system shown by the process flow sheet in FIG. 2 is a multi-purpose sewage treatment plant employing either oxygen-enriched gas or air as the input to the ozonator and/or secondary oxidation units. The ozone pretreatment may be effected by $O_3$ (typically 1-5%) with pure oxygen and/or air. The optional ozone tertiary treatment may use the same ozonator source as the pretreatment for economic reasons.

Tertiary Treatment

Effluent from the aerobic secondary treatment may be further purified by ozone tertiary treatment to destroy existing micro-organisms. Potable or near-potable water can be nearly produced by this ozone treatment. The methods and apparatus are described by Wynn et al in Report EPA-R2-73-146 "Pilot Plant for Tertiary Treatment of Wastewater with Ozone," January 1973, Environmental Protection Agency, and in U.S. Pat. No. 3,835,039 (Ciambrone), incorporated herein by reference. Reduction of BOD, COD, disinfection, and aeration all occur in the ozonated effluents. Significant COD reductions to below 15 ppm can be achieved at initial ozone dosages of 0.7 to 3.0 ppm ozone per ppm COD removed.

BOD can be reduced to nil with complete disinfection being accomplished by ozone tertiary treatment.

Substantial advantages are obtained by use of ozone in wastewater treatment. Ozone is a powerful oxidizing agent which has approximately twice the chemical oxidation potential of chlorine in its reactive form as hypochlorite ion. As a result, more complete oxidation can be expected from ozonation then from chlorination. Many ozone reactions are very rapid. Unlike chlorine, ozone does not always have to go into solution before reacting. In the case of disinfection, there is some evidence that a lysing reaction occurs between gaseous ozone and the micro-organism. Faster reaction times can mean shorter contact time to reach required effluent contaminant levels and, as a result, reduce capital for contactors.

Ozone is also a highly efficient germicide. This results in surer bactericidal and viricidal action with shorter contact times and less sensitivity to pH and temperature than for chlorine. The reactions with viruses are so rapid that they are difficult to study analytically. A more efficient kill of viruses than of bacteria is obtained by ozone. In both microbial classes ozonation is an improvement over chlorination in terms of rate and sureness of disinfection and leaves a beneficial oxygen residual as a reaction product. Ozonation for COD reduction showed a dissolved oxygen contact (DO) of 40 ppm in the effluent. The use of air as the ozonator feed would, of course, leave a lower residual but would still increase the DO.

As a class, oxidized or partially oxidized products are generally less toxic than chlorinated or unreacted species. This is a generality which requires further testing. However, comparison of the toxicity of ozonated versus chlorinated effluents tends to support the generality.

Since many oxidation reactions and disinfection reactions are rapid, efficient use of ozone must be accomplished with short contact times and little loss due to decomposition.

A major advantage results from the use of ozone as compared with other oxidizing agents or disinfectants. A wastewater with a low toxicity level and a high DO concentration is produced by ozone treatment. Chlorination may produce highly toxic chlorinated organics and chloramines (chlorinated organics as a class are the most toxic group of organics found in wastewater) while ozone produces fully or partially oxidized organics and oxygen.

In addition to intermediate pretreatment, ozone can be used in several places in a wastewater treatment plant. These may include:
1. Disinfection of treatment plant effluents
2. Tertiary treatment
    (a) Reduction of COD and removal of BOD
    (b) Disinfection
    (c) Increased DO
    (d) Reduction of color and odor
    (e) Decrease of turbidity
3. Sludge treatment
    (a) Oxidation of secondary sludge for partial or complete volatilization of organics.
    (b) Partial oxidation and lysing to make bacteria and other organics available as food in recycle to activated sludge.
    (c) Breaking up filamentous bacterial growth and colloid structure to allow easier dewatering.
4. Combined treatment with activated carbon, filtration, ultrasonics, or other chemicals.
5. Odor control While the invention has been demonstrated by particular examples, there is no intent to limit the inventive concept except as set forth in the following claims.

What is claimed is:

1. In a process for secondary treatment of aqueous sewage containing biodegradable materials and non-biodegradable materials wherein the sewage is contacted with an $O_2$-containing gas in the presence of aerobic microorganisms, the improvement which comprises:

Contacting the sewage with an ozone-containing gas to pretreat the sewage by converting a substantial amount of the non-biodegradable material to biodegradable material.

2. The process of claim 1 further comprising a subsequent tertiary treatment with ozone to destroy the microorganisms.

* * * * *